(12) United States Patent
Bellucci et al.

(10) Patent No.: US 7,219,083 B2
(45) Date of Patent: May 15, 2007

(54) CURRENCY SYSTEM

(75) Inventors: Diane R. Bellucci, Livermore, CA (US); Dennis M. Fisher, Dayton, OH (US); Charles F. Kerr, Dalgety Bay (GB); James N.T. Doig, Dundee (GB)

(73) Assignee: NCR Corporation, Dayton, OH (US)

( * ) Notice: Subject to any disclaimer, the term of this patent is extended or adjusted under 35 U.S.C. 154(b) by 1114 days.

(21) Appl. No.: 09/795,721

(22) Filed: Feb. 28, 2001

(65) Prior Publication Data

US 2002/0120572 A1 Aug. 29, 2002

(51) Int. Cl.
*G06Q 40/00* (2006.01)

(52) U.S. Cl. .......................... 705/43; 705/44; 235/379; 235/380

(58) Field of Classification Search ................ 705/43, 705/44; 235/379, 380
See application file for complete search history.

(56) References Cited

U.S. PATENT DOCUMENTS

| | | | | |
|---|---|---|---|---|
| 5,091,713 A * | 2/1992 | Horne et al. | ................ | 340/541 |
| 5,220,501 A * | 6/1993 | Lawlor et al. | ................ | 705/40 |
| 5,326,960 A * | 7/1994 | Tannenbaum | ................ | 235/379 |
| 5,453,601 A * | 9/1995 | Rosen | ................ | 235/379 |
| 5,574,849 A * | 11/1996 | Sonnier et al. | .......... | 395/182.1 |
| 6,065,672 A * | 5/2000 | Haycock | ...................... | 235/379 |
| 6,078,902 A * | 6/2000 | Schenkler | .................... | 705/35 |
| 6,188,993 B1 * | 2/2001 | Eng et al. | ..................... | 705/37 |

* cited by examiner

*Primary Examiner*—Ella Colbert
*Assistant Examiner*—Daniel Felten
(74) *Attorney, Agent, or Firm*—Priest & Goldstein PLLC

(57) ABSTRACT

A currency system (10) is described. The system (10) comprises a currency network (12) for handling and distributing currency, an information router (40) for receiving currency information from the currency network (12), a currency analyzer (48) for locating the position of all the currency in the network (12) and for determining how the currency should be located in the network (12) to fulfil a predetermined criterion, and a currency transfer reporter (44) for receiving currency transfer requests from the analyzer (48), for issuing currency transfer instructions to a cash mover (18), for receiving currency transfer confirmations from the cash mover (18), and for automatically reconciling currency transfer instructions with currency transfer confirmations. A method of managing a currency network is also described.

6 Claims, 20 Drawing Sheets

FIG. 4

REPLENISHMENT SCHEDULE

Transactions in the Age of the Consumer
BANK IDENTIFIER: 123456
BANK NAME: Test Financial
CASH VENDOR NAME: Any Armored Carrier
CASH VENDOR BRANCH: BR028
BEGIN DATE: 04/23/1999
END DATE: 04/23/1999

Print Date: 05/14/1999
Print Time: 02:55:31 PM

| Date | ATM ID | Control ID | ATM Store | Rev | Address | Media | Repl. Amount |
|---|---|---|---|---|---|---|---|
| 04/23/1999 | AM3540 | RS97 | xxxx | 1 | 1 Apple Rise<br>44th Street<br>N.J. | US 10 | $12,000.00 |
| | | | | | | US 20 | $26,000.00 |
| | | | | | | Total: | $38,000.00 |
| 04/23/1999 | AM3578 | RS97 | xxxy | 1 | 234 Orange Ave.<br>N.J. | US 10 | $20,000.00 |
| | | | | | | US 20 | $40,000.00 |
| | | | | | | Total: | $60,000.00 |
| 04/23/1999 | AM3640 | RS97 | xxxv | 1 | 67 Plum Road<br>N.J. | US 10 | $8,000.00 |
| | | | | | | US 20 | $18,000.00 |
| | | | | | | Total: | $26,000.00 |

Report Totals: US 10: 80,000.00        US 20: 176,000.00

FIG. 6

BULK CASH ORDER

Print Date: 05/14/1999
Print Time: 02:30:38 PM

Transactions in the Age of the Consumer
BANK IDENTIFIER: 123456
BANK NAME: Test Financial
BANK ADDRESS: Any Street
Any Town
BANK CONTACT: John Doe
CONTACT PHONE: 111-222-3333
CASH VENDOR NAME: Any CIT
FROM DATE: 4/12/1999
TO DATE: 4/16/1999

AT 99999

| Pickup Date | Vendor Branch | Source / Dest | City / Branch | Media | (Plus) Currency Value | (Minus) Currency Value | Comments |
|---|---|---|---|---|---|---|---|
| 04/14/1999 | BR010 | Bank USA | Cleveland | US 20 | $260,000.00 | $0.00 | |
| | | | | Transaction Total: | $260,000.00 | $0.00 | |
| | | | | Total for 04/14/1999 | $260,000.00 | $0.00 | |
| 04/15/1999 | BR028 | Nations Bank | Miami | US 10 | $50,000.00 | $0.00 | |
| | | | | US 20 | $340,000.00 | $0.00 | |
| | | | | Transaction Total: | $390,000.00 | $0.00 | |
| | | | | Total for 04/15/1999 | $390,000.00 | $0.00 | |

FIG. 9

SETTLEMENT REPORT

Transactions in the Age of the Consumer
CASH VENDOR NAME: Any Armored Carrier
CASH VENDOR BRANCH: BR028
BANK IDENTIFIER: 123456
BANK NAME: Test Financial
FROM DATE: 04/19/1999
TO DATE: 04/20/1999

Print Date: 05/14/1999
Print Time: 02:57:24 PM

| Replenished Date | ATM ID | Control ID | Rev | Media | Replenished Value | Beginning Balance | Dispense | Ending Balance | Residual Value | Reported Overage | Reported Shortage |
|---|---|---|---|---|---|---|---|---|---|---|---|
| 04/19/1999 | AM3592 | RS97 | 1 | US 10 | $8,000.00 | $26,000.00 | $22,700.00 | $3,300.00 | $910.00 | $10.00 | $.00 |
|  |  |  |  | US 20 | $18,000.00 |  |  |  | $2,400.00 |  |  |
|  |  |  |  | Subtotals: | $26,000.00 |  |  |  | $3,310.00 |  |  |
| 04/19/1999 | AM3621 | RS97 | 1 | US 10 | $6,000.00 | $24,000.00 | $20,190.00 | $3,810.00 | $1,010.00 | $.00 | $.00 |
|  |  |  |  | US 20 | $14,000.00 |  |  |  | $2,800.00 |  |  |
|  |  |  |  | Subtotals: | $20,000.00 |  |  |  | $3,810.00 |  |  |
| 04/19/1999 | AM3631 | RS97 | 1 | US 10 | $12,000.00 | $38,000.00 | $29,500.00 | $8,500.00 | $2,200.00 | $100.00 | $.00 |
|  |  |  |  | US 20 | $26,000.00 |  |  |  | $6,400.00 |  |  |
|  |  |  |  | Subtotals: | $38,000.00 |  |  |  | $8,600.00 |  |  |
| 04/20/1999 | AM3586 | RS97 | 1 | US 10 | $10,000.00 | $24,000.00 | $6,100.00 | $17,900.00 | $4,100.00 | $.00 | $.00 |
|  |  |  |  | US 20 | $24,000.00 |  |  |  | $13,800.00 |  |  |
|  |  |  |  | Subtotals: | $34,000.00 |  |  |  | $17,900.00 |  |  |
| 04/20/1999 | AM3590 | RS97 | 1 | US 10 | $10,000.00 | $46,000.00 | $41,200.00 | $5,800.00 | $1,200.00 | $.00 | $.00 |
|  |  |  |  | US 20 | $20,000.00 |  |  |  | $4,600.00 |  |  |
|  |  |  |  | Subtotals: | $30,000.00 |  |  |  | $5,800.00 |  |  |

Report Totals:  Replenished Values
    US 10: $60,000.00
    US 20: $136,000.00

Residual Values
    US 10: $11,850.00
    US 20: $34,580.00

FIG. 10

NCR

MISSING SETTLEMENT

Transactions in the Age of the Consumer
BANK IDENTIFIER: 123456
BANK NAME: Test Financial
CASH VENDOR NAME: Any Armored Carrier
CASH VENDOR BRANCH: BR010
BEGIN DATE: 04/21/1999
END DATE: 04/21/1999

Print Date: 05/14/1999
Print Time: 03:20:48 PM

| Date | ATM ID | Control ID | Rev | ATM Store | Address | Media | Repl. Amount | Days Late |
|---|---|---|---|---|---|---|---|---|
| 04/21/1999 | AM0282 | RS97 | 1 | xxxx | 1 Apple Rise 44th Street N.J. | US 10 | $8,000.00 | 24 |
| | | | | | | US 20 | $18,000.00 | |
| | | | | | | Total: | $26,000.00 | |
| 04/21/1999 | AM0286 | RS97 | 1 | xxxy | 234 Orange Ave N.J. | US 10 | 4,000.00 | 24 |
| | | | | | | US 20 | $10,000.00 | |
| | | | | | | Total: | $14,000.00 | |
| 04/21/1999 | AM0287 | RS97 | 1 | xxyy | 67 Plum Road N.J. | US 10 | $4,000.00 | 24 |
| | | | | | | US 20 | $8,000.00 | |
| | | | | | | Total: | $12,000.00 | |
| 04/21/1999 | AM0288 | RS97 | 1 | xyyy | 46 Pear Road N.J. | US 10 | $8,000.00 | 24 |
| | | | | | | US 20 | $20,000.00 | |

FIG. 11

NCR
Transactions in the Age of the Consumer

VAULT RECAP REPORT

Print Date: 05/14/1999
Print Time: 02:59:53 PM

BANK IDENTIFIER: 123456
BANK NAME: Test Financial
CASH VENDOR NAME: Any Armored Carrier
CASH VENDOR BRANCH: BR010
FROM DATE: 04/19/1999
TO DATE: 05/13/1999

| Recap Date | Media | Begin Cash | Cash In | Cash Out | Residual ATM In | Replenish ATM Out | Vault Recap Ending Balance | Vault Recap Emergency Cash | Vault Recap Comments |
|---|---|---|---|---|---|---|---|---|---|
| 04/20/1999 | US 10 | $0.00 | $137,570.00 | $0.00 | $2,430.00 | $14,000.00 | $126,000.00 | $0.00 | Entering Beginning Balance |
| 04/20/1999 | US 20 | $0.00 | $369,420.00 | $0.00 | $4,580.00 | $34,000.00 | $340,000.00 | $0.00 | Entering Beginning Balance |
| Totals: | | $0.00 | $506,990.00 | $0.00 | $7,010.00 | $48,000.00 | $466,000.00 | | |

FIG. 12

NCR MISSING VAULT RECAP

Transactions in the Age of the Consumer

Print Date: 05/14/1999
Print Time: 03:22:02 PM

From Date: 04/19/1999
To Date: 04/19/1999

| Bank Name | Cash Vendor | Vendor Branch | Business date |
|---|---|---|---|
| Test Financial | Any Armored Carrier | BR010 | 04/19/1999 |
| Test Financial | Any Armored Carrier | BR028 | 04/19/1999 |

FIG. 13

ⓢNCR VAULT OUT-OF-BALANCE REPORT

Transactions in the Age of the Consumer

BANK IDENTIFIER: 123456
BANK NAME: Test Financial
FROM DATE: 04/05/1999
TO DATE: 04/30/1999

Print Date: 05/20/1999
Print Time: 08:59:56 AM

| Cash Vendor Name | Cash Vendor Branch | Recap Date | Media | Bus. Date Prev. Ending | Beginning | Diff Balance |
|---|---|---|---|---|---|---|
| Any Armored Carrier | B0083 | 04/05/1999 | US 10 | $280,630.00 | $0.00 | $-280,630.00 |
| Any Armored Carrier | B0083 | 04/05/1999 | US 20 | $287,020.00 | $0.00 | $-287,020.00 |
|  |  |  |  |  |  | $-567,650.00 |
| Any Armored Carrier | B0510 | 04/05/1999 | US 10 | $144,580.00 | $0.00 | $-144,580.00 |
| Any Armored Carrier | B0510 | 04/05/1999 | US 20 | $251,040.00 | $0.00 | $-251,040.00 |
|  |  |  |  |  |  | $-395,620.00 |

FIG. 14

⊕NCR EMERGENCY SETTLEMENT REPORT

Transactions in the Age of the Consumer
CASH VENDOR NAME: Any Armored Carrier
CASH VENDOR BRANCH: BR028
BANK IDENTIFIER: 123456
BANK NAME: Test Financial
FROM DATE: 03/01/1999
TO DATE: 05/14/1999

Print Date: 05/20/1999
Print Time: 07:47:49 AM

| Replenished Date | ATM ID | Control ID | Rev | Media | Replenished Value | Beginning Balance | Dispense | Ending Balance | Residual Value | Reported Overage | Reported Shortage |
|---|---|---|---|---|---|---|---|---|---|---|---|
| 05/14/1999 | AM3540 | 000001111334 | 1 | US 10 | $2,000.00 | $38,000.00 | $38,000.00 | $0.00 | $0.00 | $0.00 | $0.00 |
|  |  |  |  | US 20 | $8,000.00 |  |  |  | $0.00 |  |  |
|  |  |  |  | Subtotals: | $10,000.00 |  |  |  | $0.00 |  |  |

CURRENCY SYSTEM

BACKGROUND OF THE INVENTION

The present invention relates to a currency system. In particular, but not exclusively, the invention relates to an automated teller machine (ATM) currency system.

Financial institutions provide ATMs to allow customers of the institutions to obtain cash (in the form of banknotes) in an unattended environment. These ATMs are interconnected by a network. ATM networks are managed to ensure that the ATMs are adequately stocked with currency and other consumables (such as printer paper), and to ensure that the total amount of cash remaining in and dispensed from each ATM matches the amount of cash put into each ATM.

Financial institutions either manage ATM networks themselves, or use third party ATM management centers (AMCs) to assist them with this task. In either case, the ATM manager (the financial institution or the third party AMC) typically instructs a cash-in-transit (CIT) company to convey cash to and from the ATMs. A CIT company uses armored vans to transport cash securely.

Each financial institution typically provides a CIT company with a large amount of banknotes that are securely stored in a vault in the CIT company's premises. The CIT company uses these banknotes to fill currency cassettes for loading into ATMs in the network.

The ATM manager typically provides a CIT company with a printed statement including replenishment instructions, such as: what ATMs in a network are to be replenished; when they are to be replenished; and with how much money each ATM is to be replenished. These printed statements are typically referred to as replenishment schedules, and are manually transmitted, for example by fax or email, from the ATM manager to the CIT company.

Once a CIT company has completed a replenishment operation, the CIT company sends a settlement notice to the ATM manager (typically via fax or email), indicating what ATMs were replenished, at what time each ATM was replenished, with how much cash each ATM was replenished, and how much cash remained in each ATM before replenishment.

The CIT company also periodically (typically daily) sends a report to the ATM manager about how much money has been removed from a vault, how much money has been added to a vault, and how much money remains in the vault. This report is referred to as a vault recap. When the amount of banknotes in the vault falls below a certain level, the financial institution issues a cash order to replenish the vault with banknotes.

The ATM manager uses the vault recap and the settlement notice to ensure that all of the cash in the currency network (the vault, armored cars, and ATMs) is accounted for.

This system has a number of disadvantages. It is difficult to track the movement of cash because the cash is located in a vault, in armored vans, and in ATMs. It is also difficult to determine the location of all the cash within the currency network; this makes it difficult to determine the optimum location of the cash. Having cash in non-optimum locations is a high cost for the financial institution that owns the cash, because of the interest paid by the financial institution for this cash, because this cash cannot be used to generate interest for the financial institution, and because it is very expensive to move large amounts of cash.

Accounting for all of the cash in the currency network is time consuming because of the amount of paper that has to be processed. If cash remains unaccounted for, it is difficult to determine where the cash disappeared due to the lack of a robust audit trail.

SUMMARY OF THE INVENTION

It is among the objects of embodiments of the present invention to obviate or mitigate one or more of the above disadvantages or other disadvantages associated with currency networks.

According to a first aspect of the present invention there is provided a currency system comprising:

a currency network for handling and distributing currency;

an information router for receiving currency information from the currency network;

a currency analyzer for locating the position of all the currency in the network and for determining how the currency should be located in the network to fulfil a predetermined criterion; and a currency transfer reporter for receiving currency transfer requests from the analyzer, for issuing currency transfer instructions to a cash mover, for receiving currency transfer confirmations from the cash mover, and for automatically reconciling currency transfer instructions with currency transfer confirmations.

Preferably, the system also includes a dispatcher for dispatching a resource to the currency network Preferably, the information router is also operable to receive state of health information, and the router is operable to direct state of health information to the dispatcher, and to direct currency information to the currency analyzer.

Preferably, the cash mover is a CIT organization.

The predetermined criterion may be to minimize the cost of the currency network while providing a high level of service, or the criterion may be to ensure that the network remains operational at all times, or a combination of these, or some other criterion.

The term "criterion" is used herein in a generic sense to include a single principle (which is the conventional use of the term "criterion") and multiple principles (which would conventionally be denoted by the plural term "criteria").

By virtue of this aspect of the invention, high availability of a currency network (such as an ATM network) can be ensured by automatically dispatching resources (such as maintenance engineers) to solve any problems in the currency network. Also by virtue of this aspect of the invention, optimized value for the currency network can be ensured by the currency analyzer determining how much currency should be stored in each part of the network (such as, in each ATM, in a branch, and such like) so that the reporter can instruct a replenisher (such as a CIT company) to redistribute the currency within the network. Also by virtue of this aspect of the invention, movements of currency within the system can be accounted for using the currency transfer reporter.

One advantage of this invention is that the currency handling system may be automated. Another advantage is that the information router, the currency analyzer, and the currency reporter, can all be located in a single central location.

In one embodiment, the currency reporter is implemented as a server having a transfer interface accessible by a customer at the customer's premises; the customer owning the currency in the currency network. This enables the currency owner to instruct currency transfers from their own premises. This also enables the currency owner to receive reconciliation reports showing how much currency has been transferred. The interface may be implemented as a client application. Alternatively, the transfer interface may be implemented by a customer transferring a file to a specified area on the reporter's server (for example, using FTP).

In another embodiment, the currency reporter is implemented as a server having a transfer interface accessible by the currency analyzer. This enables the currency analyzer to determine when cash should be moved and to instruct currency transfers automatically. The interface may be implemented as a client application.

The currency network may comprise stations that are electronically connected to a communication network; alternatively, the currency network may comprise stations that are part of an organization but are not coupled to a communication network.

In a preferred embodiment, the currency network comprises stations in the form of terminals such as ATMs. Alternatively, or additionally, the stations may be in the form of PoS terminals.

In another embodiment, the stations may be teller stations in a bank branch, or back-office stations in a retail outlet.

Preferably, the dispatcher is in communication with a service center for dispatching service personnel for servicing terminals in the currency network, and also in communication with a CIT center for dispatching replenishment personnel for replenishing terminals in the currency network. The dispatcher may be activated automatically or manually by an operator.

Preferably, the currency transfer reporter is operable to issue electronic currency transfer requests to the CIT center, and to receive electronic currency transfer confirmations from the CIT center. This avoids the need to have paper faxed back and forth between the CIT center and the currency transfer reporter. This also enables the currency transfer reporter automatically to reconcile transfer requests with transfer confirmations.

Preferably, the system includes a terminal access control authorizer for determining who can access a terminal in the network and for maintaining a record of accesses to each terminal. Conveniently, this is implemented by each ATM including an electronic lock operating on a one time combination principle, such that any person wishing to gain access to the ATM must contact the terminal access control authorizer to receive a one time access code, used in conjunction with a personal electronic key, to allow opening of the lock. In one embodiment, the electronic lock is a Cencon (trade mark) lock available from Mas-Hamilton, 805D Newtown Circle, Lexington, Ky., 40511-1240, U.S.A.

Preferably, the lock provides an audit trail showing terminal access activity for each electronic key holder.

Preferably, the currency analyzer is operable to issue currency transfer requests to the currency transfer reporter.

Preferably, the router is implemented by a Gasper Manager (trade mark) computer program executing on a Windows (trade mark) NT (trade mark) server. Gasper Manager (trade mark) is supplied by Gasper Corporation (trade mark), 1430 Oak Court, Suite 314, Dayton, Ohio 45430, U.S.A.

Preferably, the currency analyzer is implemented by an Optica$h (trade mark) computer program executing on a Windows (trade mark) NT (trade mark) server. Optica$h (trade mark) is available from Transoft International Incorporated (trade mark), 115 Center West Court, Cary, N.C. 27513 U.S.A.

Preferably, the dispatcher is implemented by a Remedy Helpdesk (trade mark) computer program executing on a Unix server. Remedy Helpdesk (trade mark) is available from Remedy Corporation (trade mark) 1505 Salado Drive, Mountain View, Calif. 94043, U.S.A.

Preferably, the Remedy Helpdesk (trade mark) is operable to create a work order file in a secure format for instructing a dispatch one system to dispatch a resource (such as first line maintenance personnel or second line maintenance personnel); and to receive a work order response for confirming receipt of the work order file by the dispatch one system.

According to a second aspect of the present invention there is provided a currency transfer reporter, the reporter comprising a server, a transfer request interface, and a replenisher interface, wherein the reporter is operable to issue, receive, and reconcile currency transfer information.

Preferably, the reporter is operable to receive a currency transfer request via the transfer request interface, prepare instructions for transferring the requested currency, transmit the instructions to the replenisher interface, receive currency transfer confirmation via the replenisher interface on successful execution of the instructions, reconcile the currency transfer confirmation with the currency transfer request, and transmit a report to the transfer request interface indicating that the currency transfer request has been successfully executed.

In a preferred embodiment, these steps are implemented by a computer program product executing on the server.

The transfer interface may be located within a customer's premises to allow a customer to transmit transfer requests to the currency transfer reporter.

Preferably, the reporter is also operable to notify the replenisher if the currency transfer confirmation does not match the currency transfer request.

Preferably, the reporter includes an encryption/decryption facility for encrypting currency transfer requests and decrypting currency transfer confirmations.

According to a third aspect of the present invention there is provided a currency optimization system for use with a currency network, the system comprising a currency analyzer for locating the position of all the currency in the network and for determining how the currency should be located in the network to fulfil a currency optimization criterion, and a currency transfer reporter for receiving currency transfer requests from the currency analyzer and for issuing currency transfer instructions to transfer currency within the network to optimize the position of the currency within the network.

According to a fourth aspect of the invention there is provided a method of managing a currency network, the method comprising the steps of: locating the position of all the currency in the network; determining how the currency should be located in the network to fulfil a currency optimization criterion; issuing electronic currency transfer instructions to transfer currency within the network to optimize the position of the currency within the network; receiving electronic currency transfer confirmations; and reconciling the issued instructions with the received confirmations.

BRIEF DESCRIPTION OF THE DRAWINGS

These and other aspects of the present invention will be apparent from the following specific description, given by way of example, with reference to the accompanying drawings, in which:

FIG. 4 is a graphical representation of a cash transfer request file for a replenishment operation;

FIG. 6 is a graphical representation of a cash transfer request file for a bulk cash order operation;

FIG. 9 is a graphical representation of a report relating to an executed cash transfer operation;

FIG. 10 is a graphical representation of a notification of a missing cash transfer report;

FIG. 11 is a graphical representation of a vault recap report;

FIG. 12 is a graphical representation of a notification of a missing vault recap report;

FIG. 13 is a graphical representation of a notification of an out of balance vault recap report;

FIG. 14 is a graphical representation of a report relating to an emergency replenishment operation;

DETAILED DESCRIPTION

Figure 1:
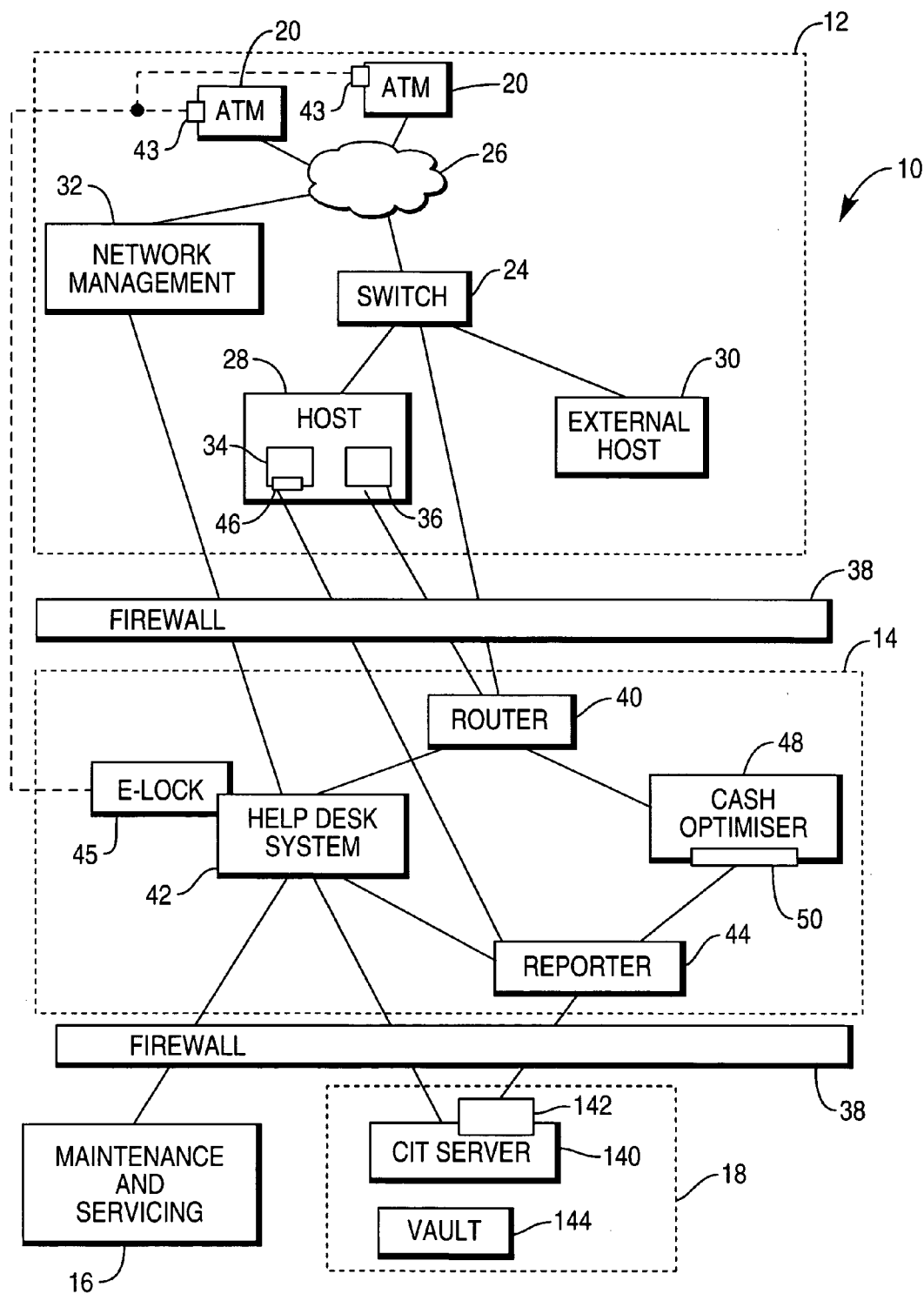
FIG. 1 is a block diagram of a currency system according to one embodiment of the present invention.

Reference is first made to FIG. 1, which shows a currency system 10 in the form of an ATM currency system according to one embodiment of the present invention. The system 10 is owned and operated by a financial institution, and includes a currency network 12 connected to an ATM manager 14. The ATM manager 14 is connected to a servicing organization 16 for servicing the network 12, and a cash-in-transit (CIT) organization 18 for moving cash around the network 12.

The currency network 12 includes a plurality of ATMs 20 (only two of which are shown) interconnected to a transaction switch 24 by a secure network 26. The switch 24 is connected to a host 28 located within the financial institution's premises, and to a plurality of other hosts 30 (only one of which is shown) owned by other financial institutions and located remotely from the host 28. The currency network 12 also includes a network management component 32 operated by the financial institution and monitoring state of health information conveyed from each of the ATMs 20.

The host 28 includes a back-office facility 34 that typically includes details of bank accounts held by customers of the financial institution and stores information relating to transactions executed at the ATMs 20. The host 28 also includes a state of health monitoring facility 36 that monitors state of health information received from each of the ATMs 20.

The currency network 12 is connected to the ATM manager 14 via a firewall 38 for ensuring data security. Various components in the currency network 12 are connected to components in the ATM manager 14, as described below.

The switch 24 is connected to an information router 40 within the ATM manager 14. The switch conveys ATM status messages and ATM recycle and reset messages to the router 40. The switch 24 also conveys transaction information to the router 40. The state of health monitoring facility 36 is also connected to the router 40, and sends state of health information about the ATMs 20 in the currency network 12 to the router 40.

Thus, the router 40 receives both transaction information and state of health information.

The router 40 is implemented by a Gasper Manager (trade mark) computer program executing on a server (not shown) having a Microsoft (trade mark) Windows NT (trade mark) operating system.

When the router 40 receives information from the currency network 12, the router 40 passes this information to one of two components: a helpdesk 42, or a currency analyzer 48. If the information relates to servicing or maintenance of the currency network 12, then the router 40 directs the information to the helpdesk 42. If the information relates to currency movement (for example, transactions) then the router 40 directs the information to the currency analyzer 48.

The network management component 32 is connected to the helpdesk system 42, thereby enabling the financial institution to notify the helpdesk of any problems (referred to as incidents) in the ATM network 12. The helpdesk system 42 is manned by an operator (not shown), and comprises a Remedy (trade mark) helpdesk application executing on a Unix server (not shown). The helpdesk operator receives notification of problems (referred to as incidents) either:

(1) manually via a telephone, a facsimile machine, email, or similar, or (2) automatically via a file transferred from the router 40 or the network management component 32.

The Remedy (trade mark) application provides the helpdesk operator with a graphical user interface that notifies the operator about any incidents that have been received automatically. The Remedy (trade mark) application also allows the operator to initiate a servicing request for servicing an ATM 20 in the network 12. The servicing request is sent in a predefined format to the servicing organization 18 which receives the request, generates a work order to implement the request, and returns a response to the Remedy application.

Each ATM 20 includes a safe (not shown) secured by an electronic lock 43 in the form of a Mas-Hamilton (trade mark) one time combination Cencon (trade mark) lock. Combinations for the Cencon (trade mark) lock are generated by a Cencon (trade mark) combination generator application executing on a Cencon server 45. The safe houses currency cassettes which are replaced in a replenishment operation.

To open the Cencon (trade mark) lock 43, an authorized person must call an operator (manning the helpdesk 42) to obtain an authorization code for opening the ATM safe. The operator obtains a code from the Cencon (trade mark) application via an interface executing on the helpdesk server. The authorized person also supplies the operator with a close code (generated by the lock) for closing the safe replenishment incident once the replenishment operation has been completed. The time between issuance of the one time combination and receipt of the close code from the authorized person is tracked automatically by the helpdesk to ensure that the time during which the safe was open was within a predetermined limit. If the authorized person communicates a duress or emergency signal to the operator then the operator calls a law enforcement agency to investigate.

The back-office facility 34 is connected to a currency transfer reporter 44 for receiving cash transfer reports (such as settlement information and vault recap information) from the reporter 44. The back-office facility 34 includes a user interface 46 for presenting the received information.

The currency analyzer 48 is in the form of an Optica$h (trade mark) computer program executing on a Windows NT (trade mark) server. The analyzer 48 receives currency information from the router 40. The router 40 provides the analyzer 48 with transaction information received from the switch 24. The analyzer 48 uses the transaction information to determine the location of all of the cash in the currency network 12, including the cash stored in vaults in the CIT premises, and cash located in CIT vehicles.

The analyzer 48 then predicts the optimum location for cash in the network 12 to meet a predetermined criterion selected by a user. The predetermined criterion may be to minimize the amount of cash in each ATM 20 without creating a high risk (for example, greater than 1%) of an ATM 20 running out of cash.

Using these predictions, the analyzer 48 determines when, and how much, cash should be moved to or from an ATM 20, to or from a vault, and such like.

The analyzer 48 is coupled to the reporter 44 via a transfer interface 50. When the analyzer 48 determines that cash should be moved, the analyzer 48 issues a cash transfer request to the reporter 44 via the transfer interface 50.

The reporter 44 receives the request via the transfer interface 50, prepares a replenishment schedule or cash order, and issues the schedule or order to the CIT organization 18

Figure 2:
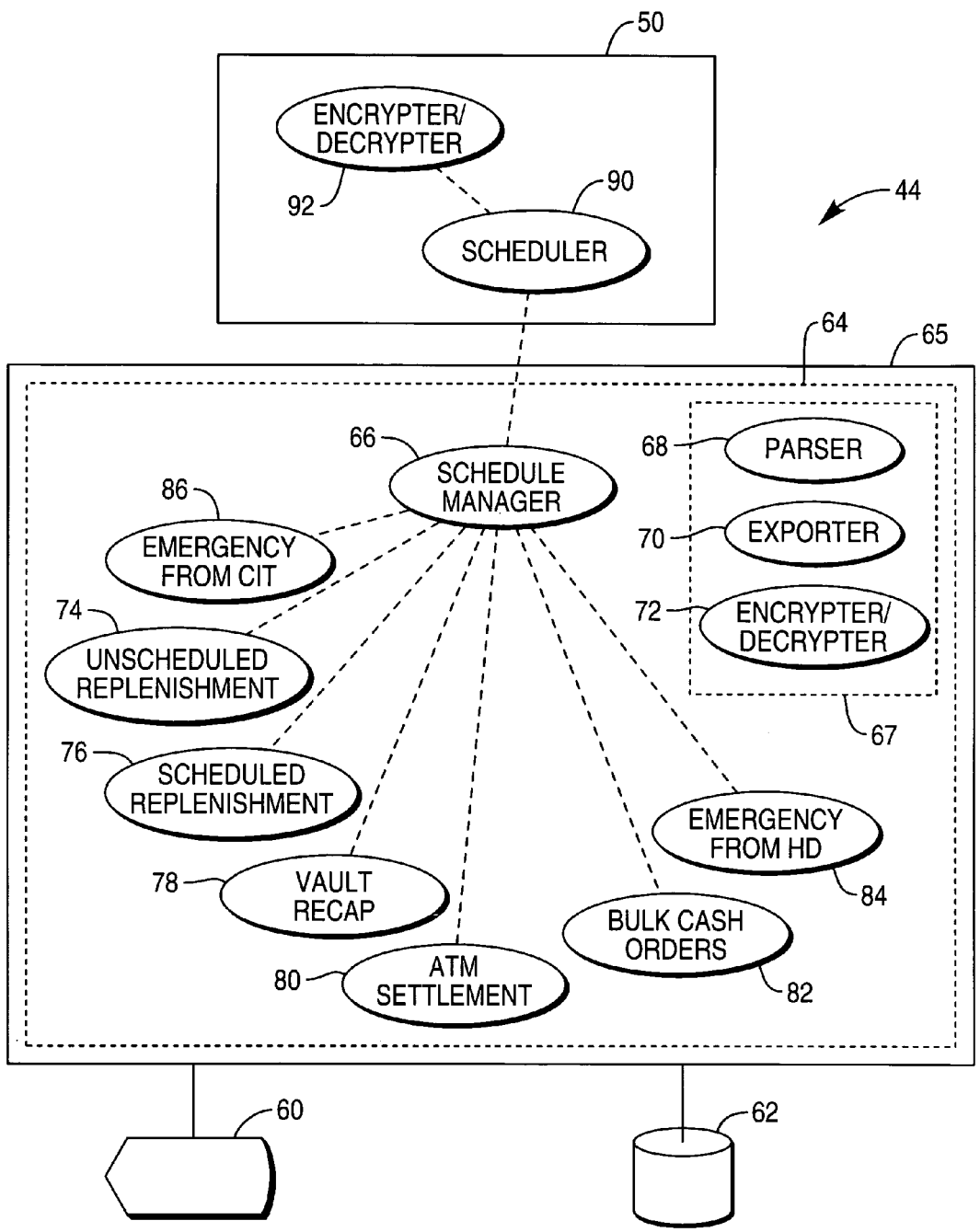
FIG. 2 is a schematic diagram of components within the currency system of FIG. 1.

The reporter 44 will now be described in more detail with reference to FIG. 2, which is a diagram of software components within the transfer interface 50 and components within the reporter 44.

The reporter 44 includes a display 60, file storage 62, and a computer program 64 executing in memory 65 on a Windows (trade mark) NT (trade mark) server (not shown).

The program 64 has an administration component 66, three common routines 67, and seven business objects.

The administration component 66 is referred to as the schedule manager and calls one of the seven business objects depending on the operation requested by the analyzer 48. The schedule manager 66 is also connected to the back office user interface 46 and to the CIT organization 18.

The three common routines 67 are routines that can be invoked by any of the business objects and comprise a parser 68, an exporter 70, and an encryption/decryption routine 72.

The business objects are: unscheduled replenishment 74, scheduled replenishment 76, vault recap 78, ATM settlement 80, bulk cash order 82, emergency replenishment from the helpdesk 84, and emergency from CIT 86. Each business object includes logic to implement rules required to implement the function performed by that object. Thus, each object includes the rules and logic required to perform a function and to invoke the common routines 67 required to execute that function.

The schedule manager 66 together with the unscheduled replenishment 74, scheduled replenishment 76, bulk cash order 82, emergency replenishment from the helpdesk 84, and emergency from CIT 86 objects form a transfer request interface. The schedule manager 66 together with the vault recap 78 and ATM settlement 80 objects form a replenisher interface.

A scheduled replenishment is typically a periodic request to replenish certain ATMs with an amount of money. A scheduled replenishment operation may be conducted daily, or a predetermined number of times each week or month.

An unscheduled replenishment is an additional replenishment that is required between scheduled replenishments, but is not an emergency. A CIT company will typically make an unscheduled replenishment at the next convenient opportunity for them to do so.

A vault recap is a report indicating how much cash was in a vault at the start of a day, how much cash has been added, how much cash has been removed, and the amount of cash remaining at the end of the day.

An ATM settlement is a confirmation prepared by the CIT of the scheduled and unscheduled replenishment operations executed by the CIT, and also includes a count of the cash replenished and a count of the residual cash returned to the vault.

A bulk cash order is a request relating to cash transfer to a vault from, for example, a Federal Reserve bank.

An emergency replenishment from the helpdesk relates to a request from the helpdesk 42 for a replenishment operation. Typically, a bank or branch will contact the helpdesk 42 to request an emergency replenishment for one or more ATMs 20. The helpdesk 42 will contact and instruct the CIT organization 18 directly, and inform the reporter 44 using this emergency replenishment from the helpdesk report.

An emergency replenishment from the CIT is similar to the ATM Settlement, and is prepared by the CIT as a confirmation that the emergency replenishment received from helpdesk has been executed by the CIT and includes a count of the cash replenished.

The transfer interface 50 includes two functions that are called by the analyzer 48 when issuing a cash transfer request. The functions are: a scheduler function 90, and an encrypter/decrypter function 92.

Figure 3:
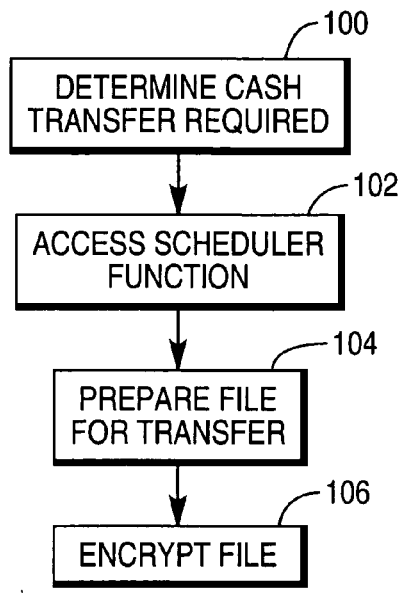
FIG. 3 is a flowchart illustrating the steps involved in preparing a cash transfer request.

The operation of the analyzer 48 in issuing a cash transfer request will now be described with reference to FIG. 2 and particularly to FIG. 3, which is a flowchart illustrating the steps involved in preparing a cash transfer request.

The analyzer 48 first determines what type of cash transfer is required (step 100). Typically, the cash transfer is a bulk cash order, an ATM replenishment, or both. In this example, an ATM replenishment is required.

The analyzer 48 then accesses (step 102) the scheduler function 90 in the cash transfer interface 50. The scheduler function 90 prepares a file for transfer to the schedule manager 66. A graphical representation of this ATM replenishment file 94 is shown in FIG. 4, and the data structure of this file is shown in FIG. 5.

Figure 5:
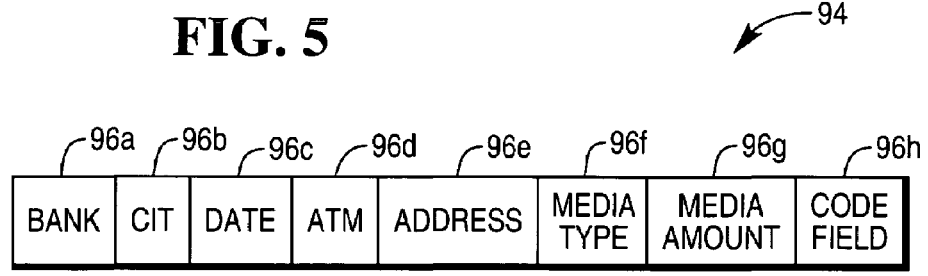
FIG. 5 is a graphical representation of the data structure of the transfer request file of FIG. 4.

As can be seen from FIGS. 4 and 5, the file 94 comprises a plurality of fields 96, including: a bank field 96a indicating the name of the financial institution owning the ATMs; a CIT field 96b indicating the name of the CIT; a date field 96c indicating the date on which the replenishment is to take place; an ATM field 96d indicating the ATMs to be replenished; an address field 96e indicating the addresses of the ATMs to be replenished; a media type field 96f indicating the media denomination to be replenished; a media amount field 96g indicating the amount of each media denomination to be replenished in each ATM; and a code field 96h indicating the type of cash transfer operation requested by the file. In this example, the code is for a replenishment operation.

The scheduler 90 then prepares the file 94 for transfer (step 104), and encrypts the file (step 106) using the encrypter/decrypter routine 92. However, the code field 96h is not encrypted. In this embodiment the encryption scheme used is AT&T (trade mark) SecretAgent (trade mark) encryption software.

A graphical representation of another type of cash transfer file, namely a bulk cash order, is shown in FIG. 6. This type of file includes fields representing the name of the financial institution, the source of the cash which is to be delivered, the address of the bank or vault to which cash is to be delivered, the name of the CIT, the date on which the delivery is to take place, the media denomination to be delivered, and the amount of each media denomination to be delivered.

Once the file has been prepared for transfer, it is stored in a predetermined directory so that it can be retrieved and processed by the reporter 44.

Figure 7:
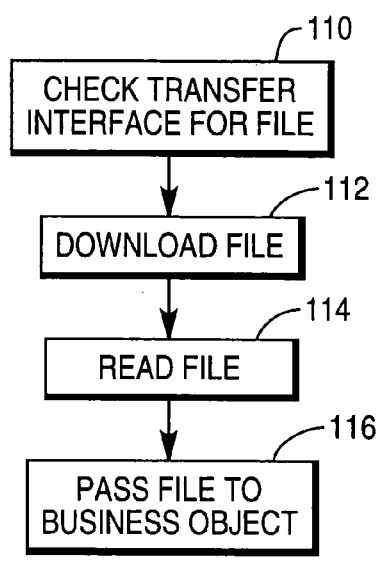
FIG. 7 is a flowchart illustrating the steps involved in routing a cash transfer request.

The operation of the reporter 44 will now be described, with reference to FIG. 7, which is a flowchart illustrating the steps involved in processing a transfer request.

The schedule manager 66 periodically (for example, every fifteen minutes) accesses (step 110) the scheduler 90 in the transfer interface 50 to determine if any files 94 are ready for transmission. If a file 94 is ready for transmission, then the schedule manager 66 downloads the file (step 112) using FTP (file transfer protocol) and reads the code field 96h (step 114) to determine which business object to pass the file to.

In this example, the file is an ATM replenishment file so the file is passed (step 116) to the scheduled replenishment business object 76.

Figure 8:
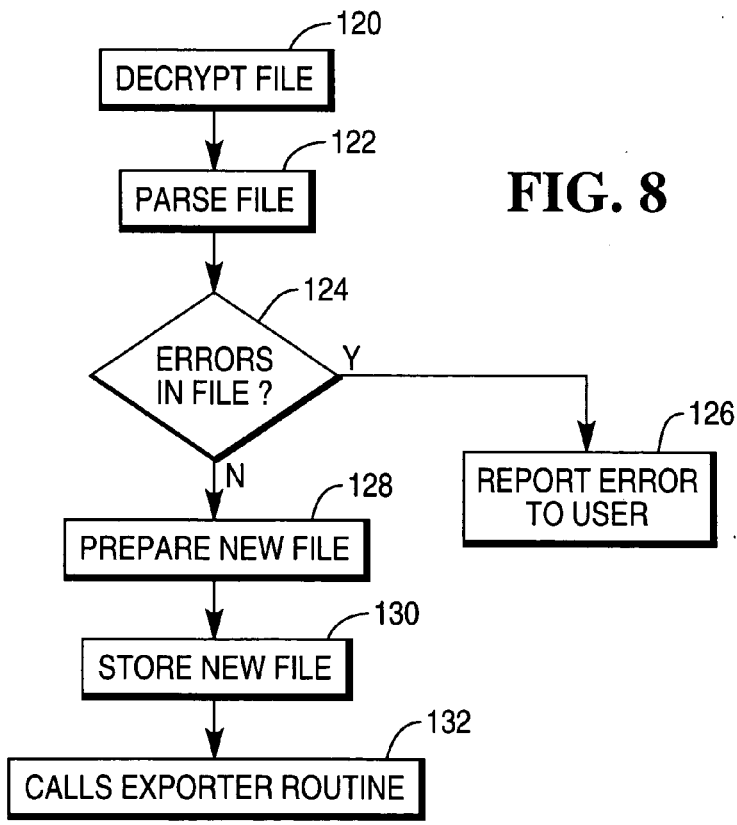
FIG. 8 is a flowchart illustrating the steps involved in processing a cash transfer request to prepare cash transfer instructions.

Referring to FIG. 8, which is a flowchart illustrating steps performed by the replenishment object 76, the replenishment object 76 calls the encrypter/decrypter routine 72 to decrypt (step 120) the file 94.

The replenishment object 76 then parses the file (steps 122, 124) using the parser routine 68.

The parser routine 68 examines the file for any errors. If any errors are found, then an error file is created in the file storage area 62 and a user is notified (step 126) via the display 60, either immediately on detection of the error or at some later time when a report is performed.

If no errors are found, then the replenishment object 76 prepares a new file (step 128) in a format acceptable to the CIT organization for instructing the CIT organization to execute an ATM replenishment organization. The replenishment object 76 then stores (step 130) a copy of this new file in the file storage area 62, and calls (step 132) the exporter routine 70 to export the file to the CIT organization 18.

The CIT organization 18 has a central server 140 executing a reporter interface 142, and a vault 144 for storing replenishment cash.

The reporter interface 142 receives the new file from the reporter 44 and implements SSL3 (Secure Sockets Layer) protocol. The reporter interface 142 requires a login and password to be used, and includes an IP address filter to ensure that only predetermined IP addresses can access the interface 142.

The CIT organization 18 dispatches a cash mover in the form of an armored van to replenish the ATMs 20 detailed in the received file. When at an ATM 20, a CIT replenisher may be required to call the helpdesk 42 to obtain an electronic combination to open the Cencon lock 43 (for example, if the replenishment occurs outside normal CIT office hours). This is logged and stored by the helpdesk 42 for audit purposes.

Once the CIT replenisher has replenished all of the ATMs 20 detailed in the new file, the replenisher returns to the CIT organization's premises and the CIT organization 18 prepares an ATM settlement report file detailing the ATMs that were replenished and how much cash was inserted and removed. The CIT organization then transfers this ATM settlement report file to the reporter 44 via reporter interface 142. A graphical representation of an ATM settlement report is shown in FIG. 9.

The reporter 44 receives this ATM settlement report file and conveys the file to the ATM settlement business object 80. After decrypting and parsing this file (using the common routines 67), the ATM settlement business object 80 determines if the settlement report matches the ATM replenishment schedule that it issued previously. If there is a discrepancy, then the reporter 44 records the discrepancy. Discrepancies may be detected by manually performing an exception report, or the reporter 44 may automatically notify a responsible person about the discrepancy so that the responsible person can liaise with the CIT organization to resolve the discrepancy.

The reporter 44 may also export a copy of the ATM settlement report file to the back-office user interface 46 so that the financial institution has updated records about the cash transfer that has occurred.

If an ATM settlement report is not received within a predetermined time after issuing the report (for example one day) then the reporter 44 records this exception, and a responsible person is notified about the absence of an ATM settlement report, as illustrated in FIG. 10, either immediately or when an exception report is performed.

Similarly, if the analyzer 48 had issued a bulk cash order request then the reporter 44 would have received a bulk cash acknowledgement report file from the CIT organization 18 after successful execution by the CIT organization 18. Typically, a vault recap report is provided for each working day, and is represented graphically in FIG. 11. If a vault recap report is not received for a working day then the reporter 44 notifies the responsible person about the absence of an vault recap report, as illustrated in FIG. 12, either immediately or when an exception report is performed. If a current business day's beginning balance does not equal the previous day's ending balance for a specified vault then the reporter 44 notifies the responsible person using a vault out of balance report, as illustrated in FIG. 13, either immediately or when an exception report is performed.

If the helpdesk 42 issues emergency ATM replenishment instructions directly to the CIT organization, then the helpdesk also automatically transfers an emergency from helpdesk file to the reporter 44. The reporter 44 stores this file. On completion of the emergency replenishment instructions the CIT organization 18 provides the reporter 44 with an emergency from CIT report file as confirmation of execution of the request. An emergency from CIT report file is illustrated in FIG. 14. The reporter 44 ensures that the instructions received from the helpdesk 42 reconcile with the confirmation received from the CIT organization 18.

If a CIT emergency replenishment report is not received within a predetermined time after the helpdesk issues the emergency replenishment instructions (for example one day) then the reporter 44 notifies the responsible person about the absence of a CIT emergency settlement report either immediately or when an exception report is performed.

It will be appreciated that this embodiment has the advantage that an analyzer automatically determines the optimum distribution of cash in the network and issues cash transfer requests to ensure that the cash is moved to provide this optimum distribution. This minimizes cash handling and replenishment costs, improves ATM availability for ATM users, reduces or eliminates paperwork associated with ATM replenishment, enables measurement of CIT performance on a daily basis, and facilitates identification of discrepancies and missed settlements.

It will also be appreciated that many different types and formats of reports can be generated automatically or manually in the event of a disparity between instructions issued and confirmations received. Typical reports include:

1. an ATM Out of Balance report, which identifies where a current day's opening balance does not match the previous day's closing balance for a specified ATM;

2. a Bulk Cash Acknowledgement report, which reports on the actual cash transfer rather than the requested cash transfer;

3. a Bulk Cash Order report, which specifies the cash source or destination for replenishment;

4. an Emergency Settlement report, which displays settlement information for ATMs replenished as a result of an emergency request;

5. a Job Schedule report, which displays scheduled jobs for the current date by user-specified criteria, such as bank identification;

6. a Late Settlement report, which identifies ATMs not replenished on the schedule date;

7. a Missing Settlement report, which identifies ATMs not replenished but scheduled to be replenished;

8. a Missing Vault Recap report, which identifies vaults or branches for which a vault recap report for a given day was not provided;

9. a Vault Out of Balance report, which identifies where a current business day's opening balance does not equal the previous day's closing balance for a specified vault;

10. a Replenishment Schedule report, which specifies a list of ATMs and dates and times when each is to be replenished;

11. a Settlement report, which displays settlement information for ATMs that have been replenished;

12. an Unmatched Settlement report, which identifies ATMs that were replenished even though no replenishment was scheduled for these ATMs;

13. a Variance by Amount report, which Identifies ATMs for a given selection criteria that were replenished with a different amount than scheduled; and 14. a Vault Recap report, which displays vault recap information for vaults used to replenish ATMs.

Another embodiment of the present invention will now be described with reference to FIG. 15, which is a block diagram of a currency system 210. The system 210 is owned and operated by a financial institution, and includes a currency network 212 connected to an ATM manager 214. The ATM manager 214 is connected to a servicing organization 216 for servicing the network 212, and a cash-in-transit (CIT) organization 218 for moving cash around the network 212.

The currency network 212 includes a plurality of ATMs 220 (only two of which are shown) interconnected to a transaction switch 224 by a secure network 226. The switch 224 is connected to a host 228 located within the financial institution's premises, and to a plurality of other hosts 230 (only one of which is shown) owned by other financial institutions and located remotely from the host 228. The currency network 212 also includes a network management component 232 operated by the financial institution and monitoring state of health information conveyed from each of the ATMs 220.

Many of the components in system 210 are identical to the corresponding components in system 10: for example, the ATMs 20,220 are identical, as are the switches 24,224, the networks 26,226, the external hosts 30,230, the network management components 32,232, the state of health monitoring facilities 36,236, the firewalls 38,238, the Centran applications 45,245, and locks 43,243, the helpdesk systems 42,242, and the servicing organizations 16,216. Therefore, these will not be described in detail.

The main difference between system 210 and system 10 is that no analyzer 48 is used in system 210, but instead a back-office facility 234 includes a client interface 246 to request cash transfers and to receive cash transfer reports from a reporter 244.

Figure 16:
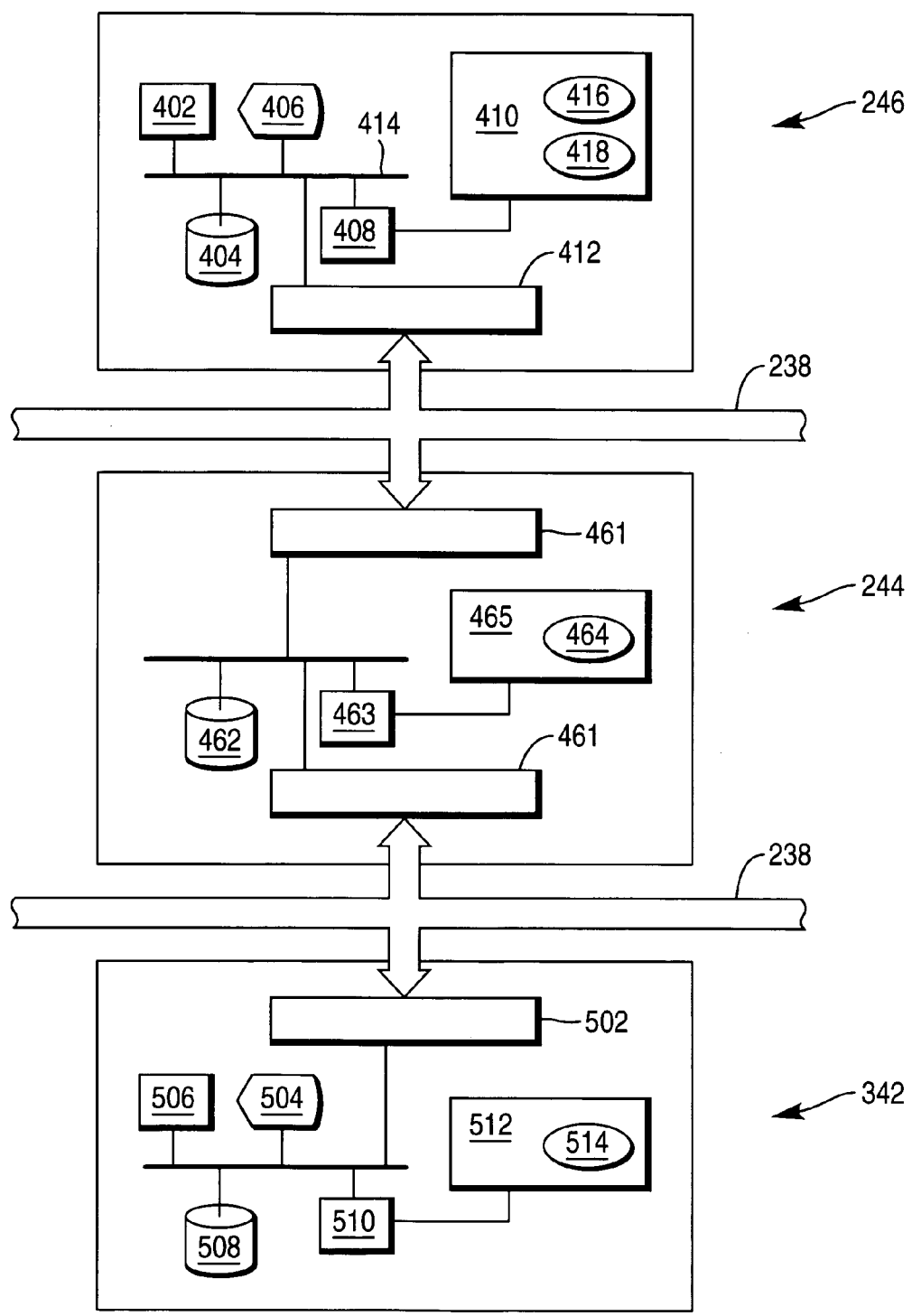
FIG. 16 is a simplified block diagram of components of the system of FIG. 15.

A block diagram of the client interface 246, the reporter 244, and a CIT reporter interface 342 is shown in FIG. 16.

Referring to FIG. 16, the client interface 246 comprises the following conventional computer components: a keypad 402, disk storage space 404, a display 406, a processor 408 and associated memory 410, and a communications module 412 in the form of a modem. All these components being mutually interconnected by a communications bus 414. In use, the memory 410 is loaded with an operating system kernel 416 and a client application 418 for instructing and monitoring cash transfers.

Figure 17:
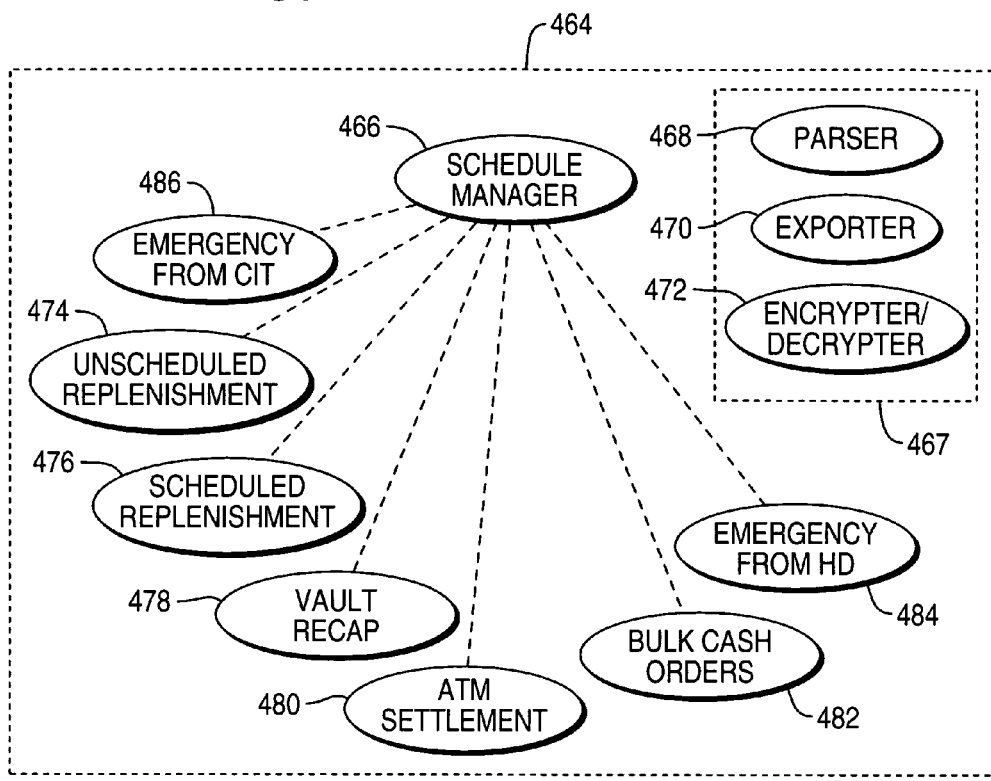
FIG. 17 is a graphical representation of elements within a program executing on one of the components (the reporter) of FIG. 15.

The reporter 244 comprises a communications module 461 in the form of a modem, disk storage 462, a processor 463 and associated memory 465 loaded with an operating system kernel (not shown for clarity) and executing a computer program 464. The program 464 is illustrated in FIG. 17, and is very similar to program 64 described above with reference to FIG. 2, and includes all of the routines and objects used in program 64.

In particular, program 464 includes: an administration component 466, three common routines 467, and seven business objects.

The administration component 466 is referred to as the schedule manager and calls one of the seven business objects depending on the operation requested by the client application 418.

The three common routines 467 are routines that can be invoked by any of the business objects and comprise a parser 468, an exporter 470, and an encryption/decryption routine 472.

The business objects are: unscheduled replenishment 474, scheduled replenishment 476, vault recap 478, ATM settlement 480, bulk cash order 482, emergency replenishment from the helpdesk 484, and emergency from CIT 486. Each business object includes logic to implement rules required to implement the function performed by that object. Thus, each object includes the rules and logic required to perform a function and to invoke the common routines 467 required to execute that function.

The CIT reporter interface 342 comprises a communications module 502 in the form of a modem, a display 504, a keyboard 506, disk storage 508, a processor 510 and associated memory 512, which, in use, executes a CIT application 514.

Figure 18:
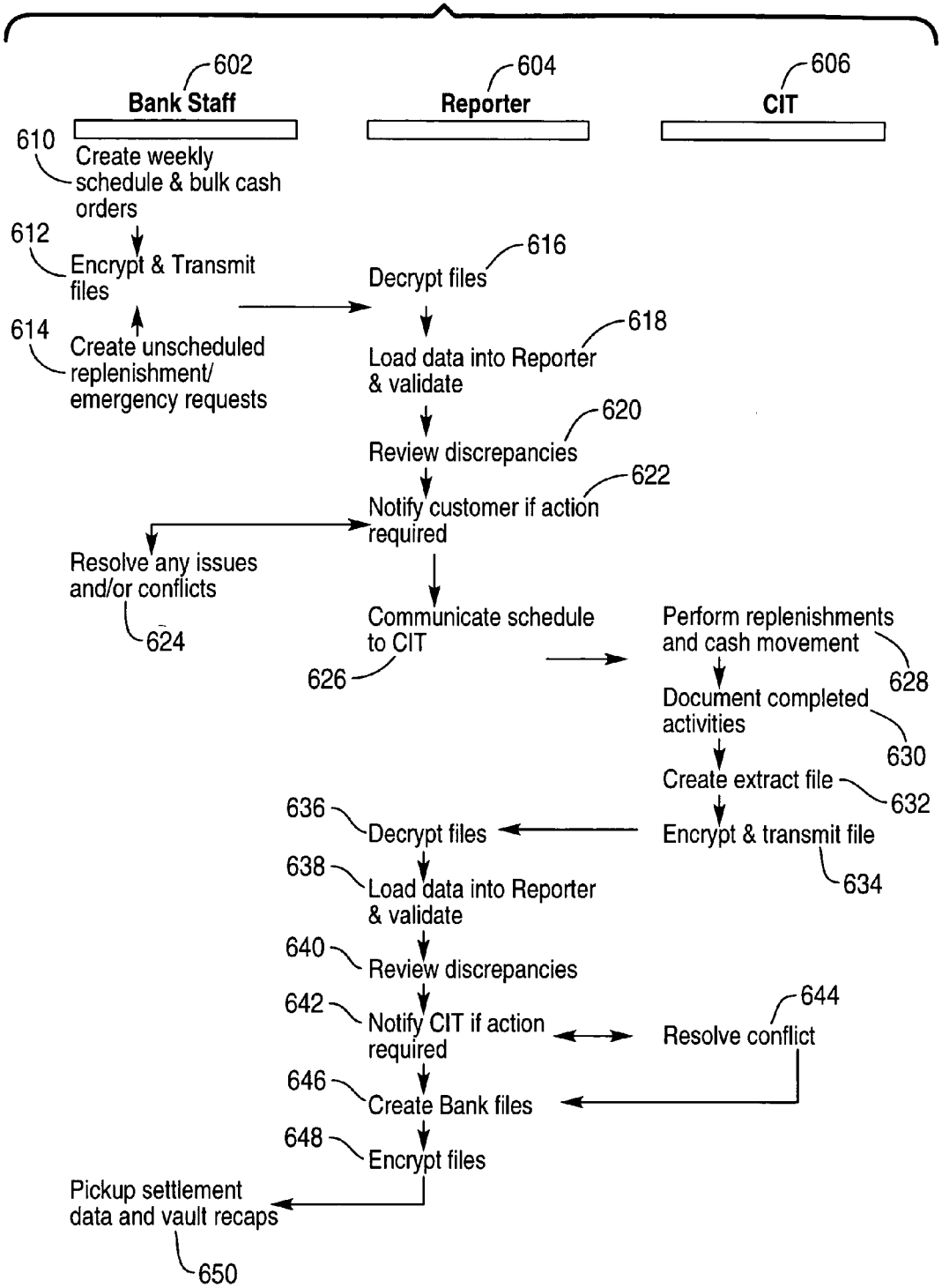
FIG. 18 is a flow diagram illustrating the steps involved in a cash transfer operation for the system of FIG. 15.

The operation of the system 210 will now be described with reference to FIGS. 15 to 18, where FIG. 18 illustrates the steps involved in a cash transfer operation.

FIG. 18 has three columns: the first column 602 represents activities performed by staff of the financial institution (hereinafter referred to as bank staff) or by the client interface 246; the second column 604 represents activities performed by the reporter 244; and the third column 606 represents activities performed by the CIT organization 218 or the CIT reporter interface 342.

Figure 19:
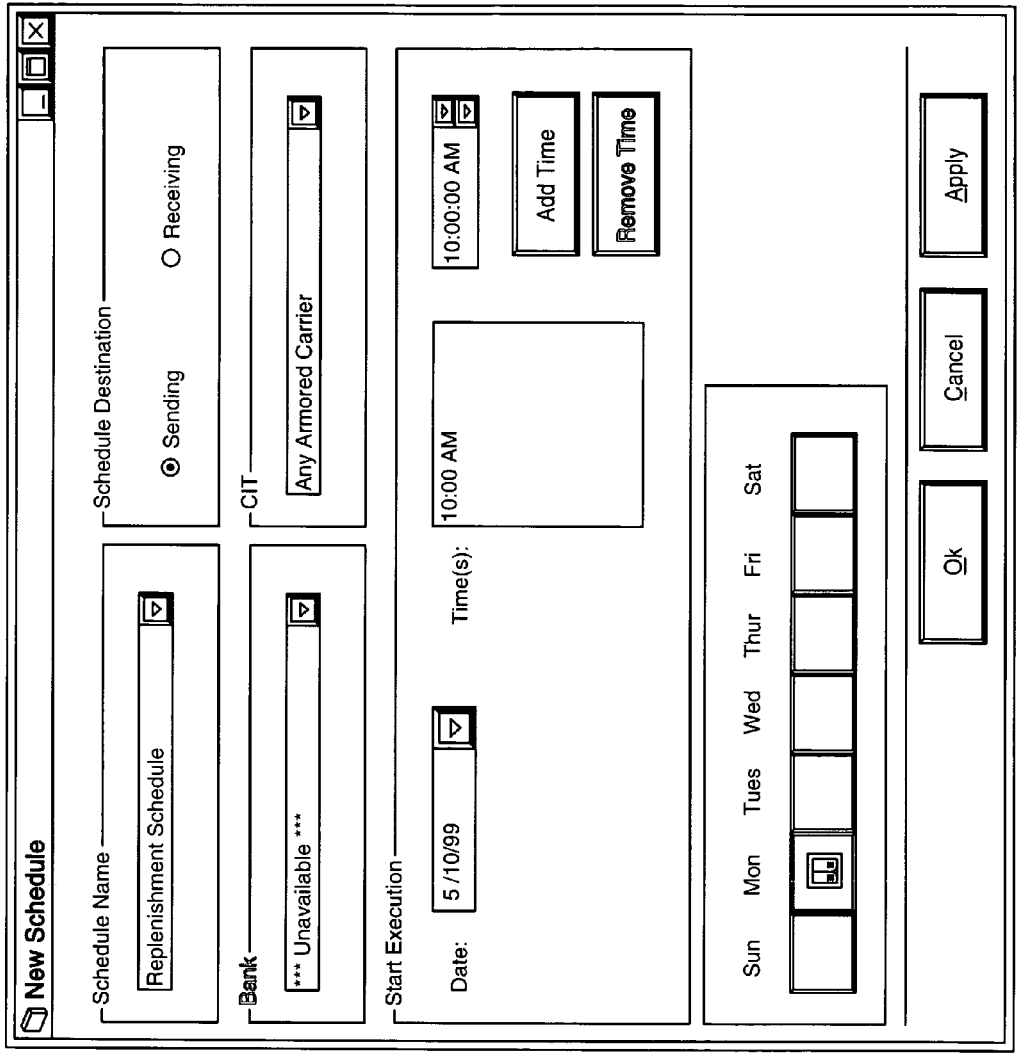
FIG. 19 is a graphical representation of a screen for adding replenishment data.

Initially, bank staff use the client application 418 to prepare replenishment schedules and a bulk cash order for the currency network 212 (step 610). The client application 418 provides the staff with a graphical user interface on display 406 to facilitate preparation of the schedules and orders, as illustrated in FIG. 19, which shows a window for creating a new replenishment schedule.

The client application 418 then converts the prepared schedules and bulk cash order into files, one file for each schedule or bulk cash order. Each file is then encrypted (step 612) by the application 418 and transmitted via modem 412 to the reporter 244.

At any time, the bank staff can create an emergency replenishment or an unscheduled replenishment using the client application 418 (step 614).

The reporter 244 receives the transmitted files via modem 461, reads each file to determine which business object should be instantiated to operate on the file (for example, the scheduled replenishment object 476), and passes the file to the appropriate business object. The appropriate business object decrypts the file (step 616) using the decryption routine 472, and parses the file (step 618) to identify any errors. The errors are then reviewed (step 620) and if any bank staff action is required then the program 464 notifies the bank staff (step 622) via the modems 461,412 and the client application 418.

In the event of bank staff receiving notification of an error, the staff resolve any problems that gave rise to the error (step 624).

If no errors were found by the reporter 244, then program 464 transmits the files to the CIT reporter interface 342 via modems 461,502 (step 626).

The CIT organization performs the cash transfers detailed in the files (step 628). Thereafter, the CIT organization uses keyboard 506 and display 504 to enter details into the CIT application 514 relating to the cash transfers that were executed (step 630).

The CIT application 514 then prepares a file for each cash transfer executed using these entered details (step 632), encrypts the files, and transmits the files (step 634) to the reporter 244 using modem 502.

The reporter 244 receives the transmitted files via modem 461, reads each file to determine which business object should be instantiated to operate on the file (for example, the ATM settlement object 480), and passes the file to the appropriate business object. The appropriate business object decrypts the file (step 636) using the decryption routine 472, and parses the file (step 638) to identify any errors and/or discrepancies (for example, if the ATM settlement does not reconcile with the corresponding scheduled replenishment). The errors and/or discrepancies are then reviewed (step 640) and if any CIT staff action is required then the program 464 notifies the CIT organization (step 642) via the modems 461,412 and the CIT application 514.

In the event of CIT staff receiving notification of an error or discrepancy, the staff resolve any problems that gave rise to the error or discrepancy (step 644), and if necessary prepare a new file for transmission to the reporter 244.

If no errors were found by the reporter 244, then program 464 creates report files for transmission to the client application 418 (step 646), and encrypts these files (step 648) using the encryption routine 472.

The bank staff use these reports to confirm that the cash transfers have been executed correctly (step 650) and to update the bank's records.

Figure 20:
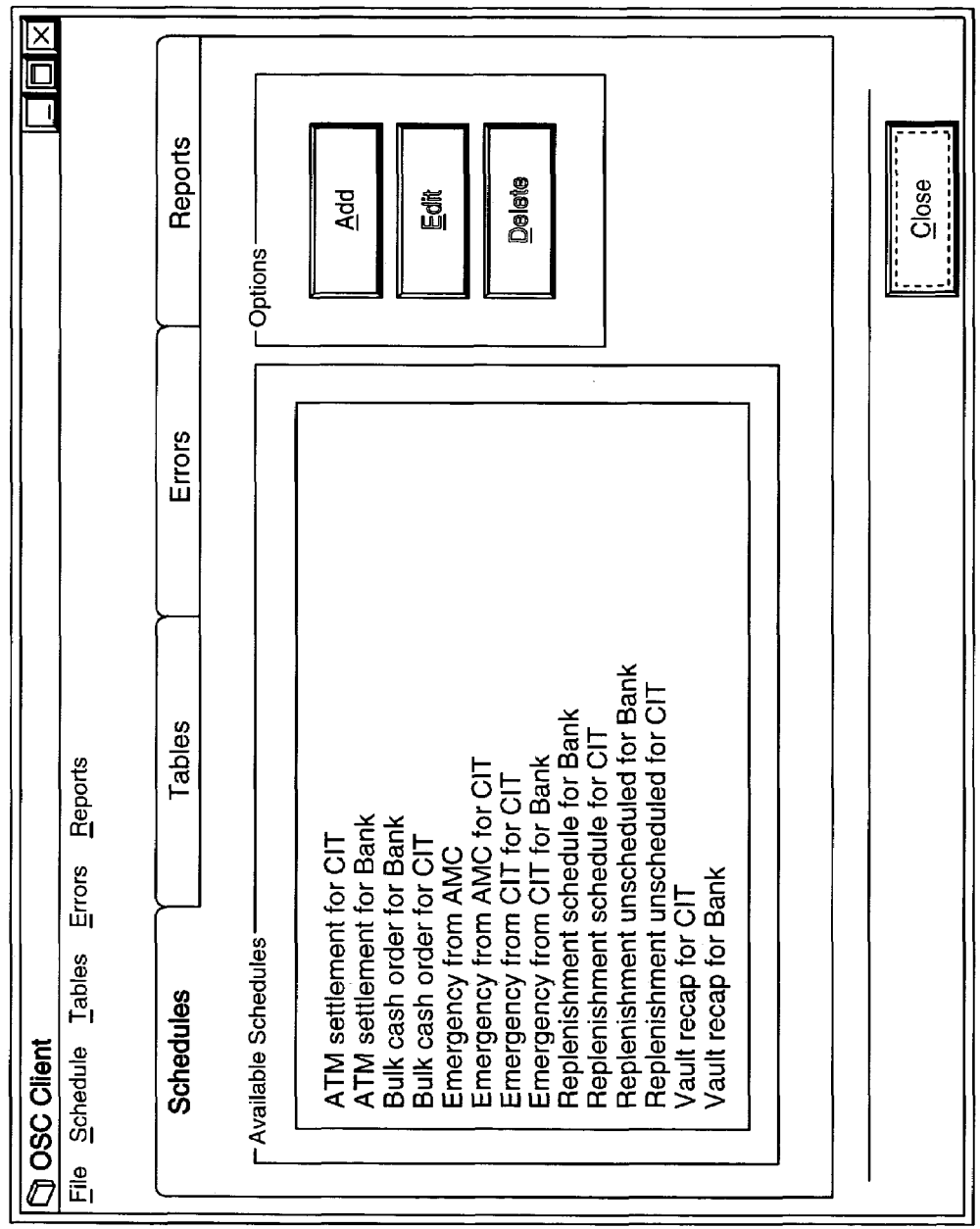
FIG. 20 is a graphical representation of a screen for displaying cash transfer information.
Figure 21:
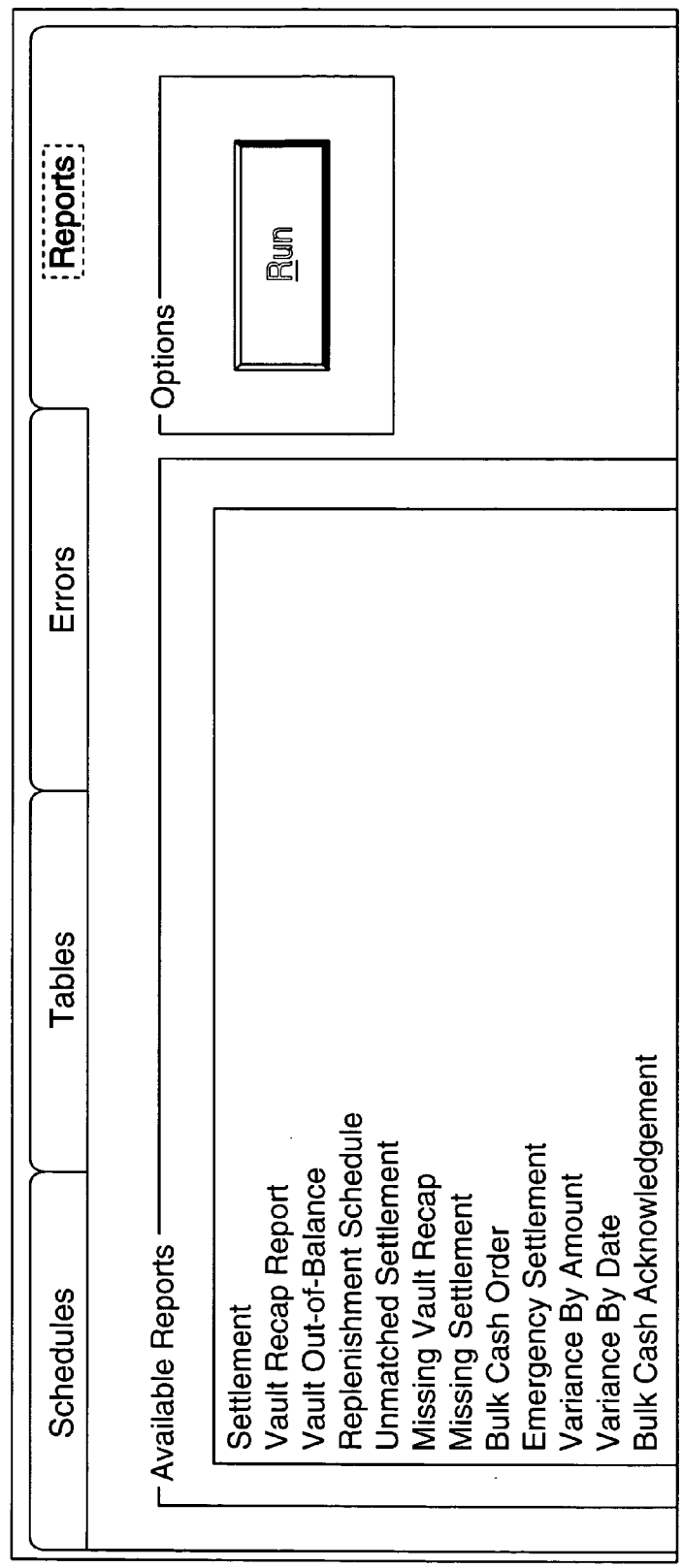
FIG. 21 is a graphical representation of a screen for displaying cash transfer report information.

As illustrated in FIGS. 20 and 21, the client application 418 allows bank staff to view schedules and cash orders that have been created, reports received for schedules, errors in schedules, and such like.

It will be appreciated that this embodiment of the present invention allows a financial institution to retain full control of scheduling replenishment operations, but avoids the institution manually having to reconcile every cash transfer.

Figure 22:
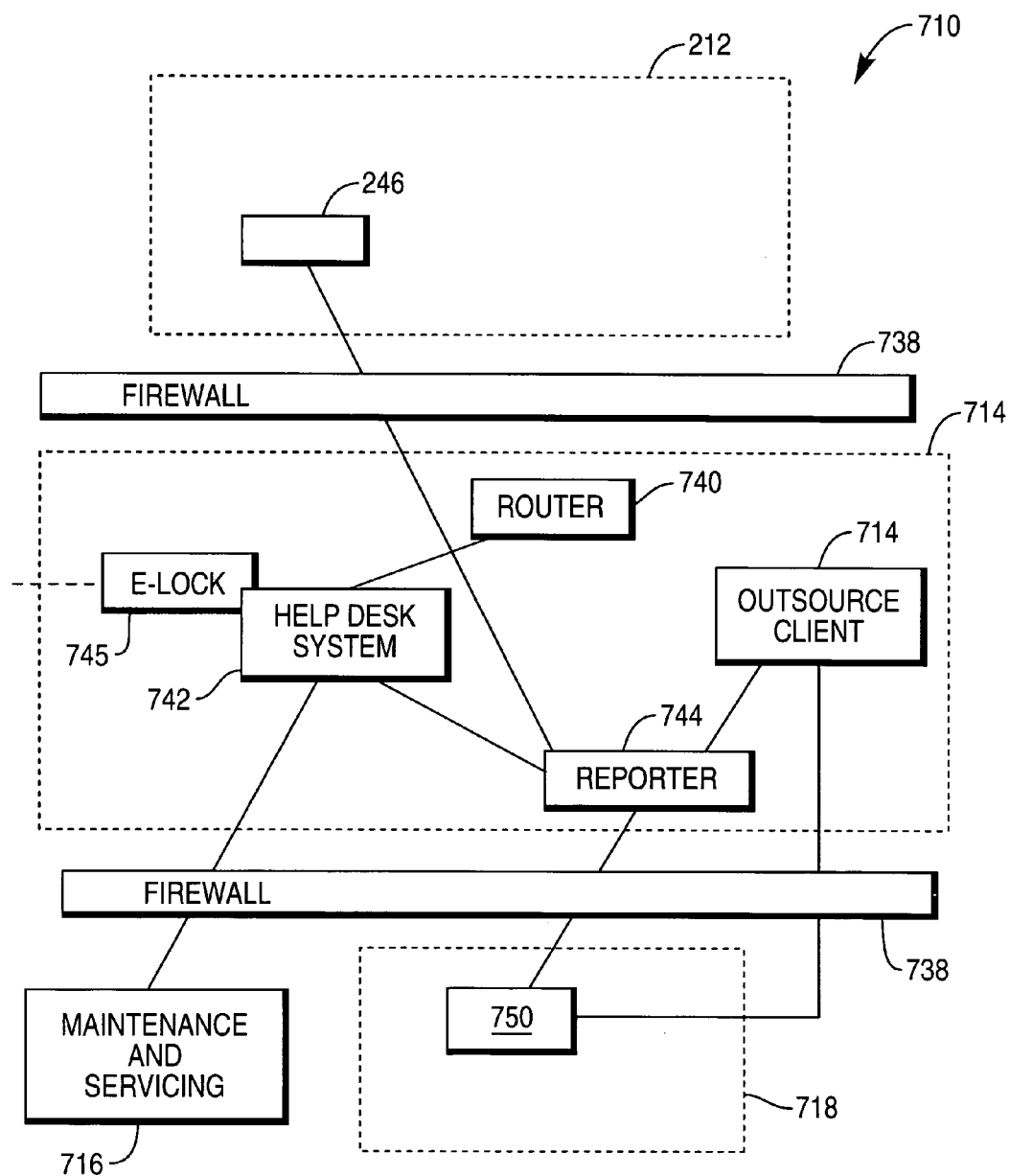
FIG. 22 is a block diagram of a currency system according to yet another embodiment of the present invention.

A third embodiment of the present invention will now be described with reference to FIG. 22, which is a simplified block diagram of a currency system 710. System 710 comprises a currency network 712 identical to currency network 212 (shown in FIG. 15), an ATM manager 714 which is similar to ATM manager 214 (FIG. 15), a servicing organization 716 identical to servicing organization 216 (FIG. 15), and a CIT organization 718 which is very similar to CIT organization 218 (FIG. 15).

Figure 15:
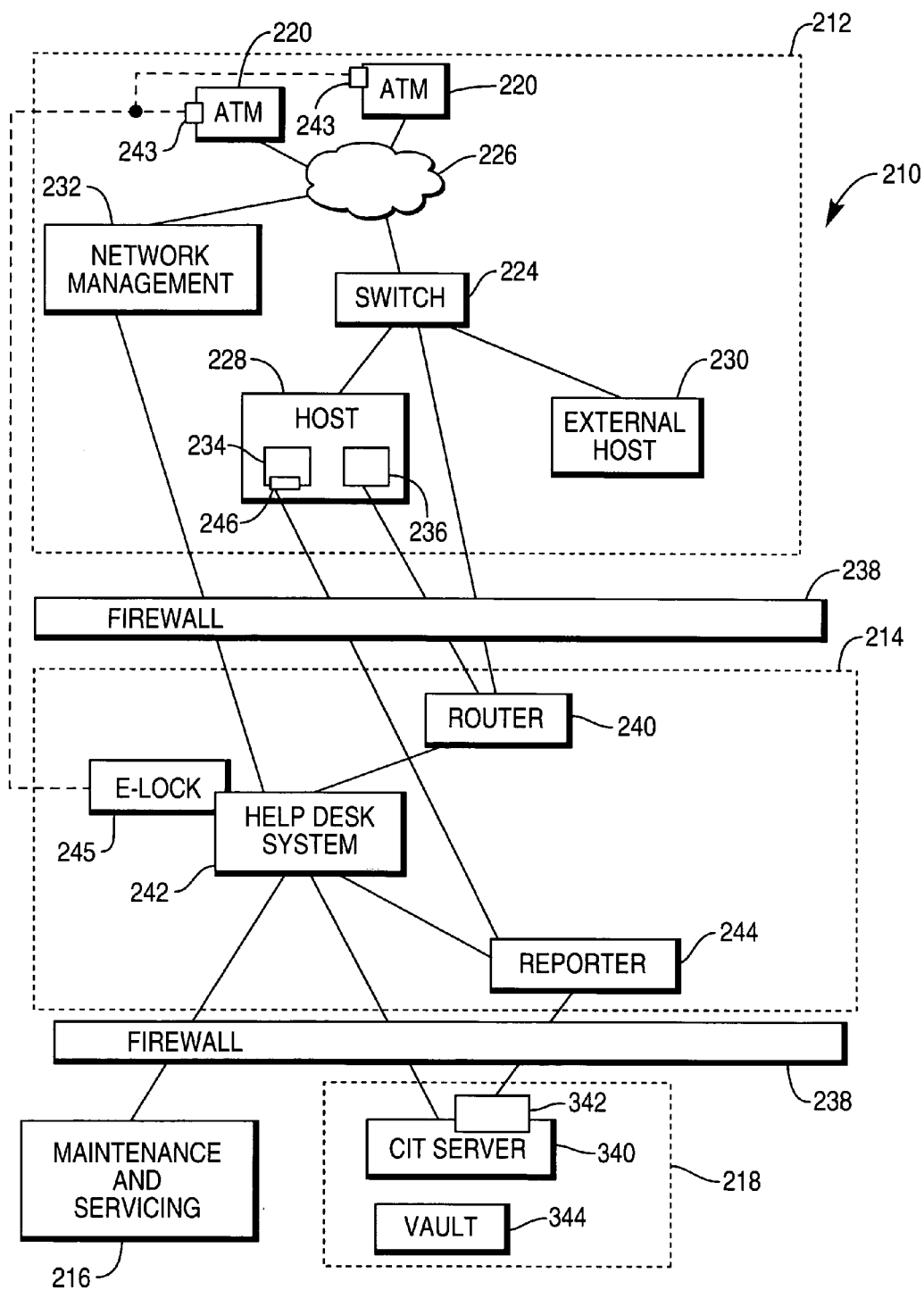
FIG. 15 is a block diagram of a currency system according to another embodiment of the present invention.

The ATM manager 714 includes three components that are identical to the corresponding components in FIG. 15, namely: a helpdesk system 742, a Centran application 745, and a router 740. The ATM manager 714 also includes a currency transfer reporter 744 that is very similar to the reporter 244 of FIG. 15. The main difference between the reporters 244 and 744 is that reporter 744 is also coupled to an outsource client application 747.

CIT organization 718 differs from CIT organization 218 in that organization 718 has a CIT interface 750 that is coupled to the reporter 744 and the outsource client application 747.

The operation of system 710 is very similar to that of system 210. Bank staff prepare and transmit replenishment schedules and bulk cash orders using client interface 246. The reporter 744 receives and validates these requests, then generates transmits instructions to the CIT organization 718. The CIT organization receives these instructions via the CIT interface 750, executes these instructions, and then prepares and transmits confirmations to the reporter 744. The reporter 744 provides the client interface 246 with ATM settlement reports and vault recap reports.

However, a major difference between the two systems 210 and 710 is that if the reporter 744 identifies a discrepancy then the outsource client 747 is notified, not the bank staff. The outsource client then notifies a responsible person who resolves the discrepancy with the CIT organization 718. The CIT organization 747 provides the outsource client 747 with performance reports, exception reports, and variance reports to enable the client 747 to monitor the performance of the CIT organization 718.

Another difference between systems 210 and 710 is that the CIT organization 718 issues invoices directly to the operator of the outsource client 747 and the operator of the outsource client 747 charges a fee to the bank for managing the cash replenishment operation.

Thus, it will be appreciated that this embodiment allows a bank or other owner of a currency network to use a third party to manage discrepancies arising during cash replenishment of the bank's currency network.

Various modifications may be made to the above described embodiment within the scope of the invention, for example, the currency network may be a retail point of sale (PoS) network, a network of teller stations in a financial institution branch, a network of financial institution branches, or a network of retail outlets. Terminals in the currency network may be automated (such as ATMs, PoS terminals, and branch terminals) or manual. In other embodiments, the currency network may not include the network management component 32, as this function may be performed by the state of health monitoring facility 36. In other embodiments, the reporter and analyzer may be combined into a single element. In other embodiments, the schedule manager 66 may not be connected to the back office user interface 46 and to the CIT organization 18; the back-office may transfer data to and from the reporter via a directory accessible by both the reporter and the back office, similarly, the CIT organization may transfer data to and from the reporter via a directory accessible by both the reporter and the CIT organization. In the above embodiments, client interfaces have been described, it will be appreciated that these interfaces may take different forms and may provide users of the interfaces with different levels of access to the reporter than those described above.

What is claimed is:

1. A currency system comprising:
   a currency network for handling and distributing physical currency;
   an information router for receiving currency information from the currency network;
   a currency analyzer for locating the position of all the physical currency in the network and for determining how the physical currency should be located in the network to fulfill one or more predetermined criteria;
   a currency transfer reporter for receiving currency transfer requests from the analyzer, for issuing currency transfer instructions to a cash mover, for receiving currency transfer confirmations from the cash mover, and for automatically reconciling currency transfer instructions with currency transfer confirmations; and
   a dispatcher for dispatching a resource to the currency network, wherein (i) the information router is operable to receive state of health information, and (ii) the router is operable to direct state of health information to the dispatcher, and to direct currency information to the currency analyzer;
   the currency network further comprises a plurality of automated teller machines (ATMs), one or more ATMs transmitting currency information including the amount of dispensable inventory of physical currency stored thereat, the currency analyzer monitoring transmitted currency information and analyzing transmitted currency information to determine when particular ones of the one or more ATMs require replenishing;
   the currency network further comprises a vault for storing physical currency, the cash mover retrieving physical currency from the vault to replenish the plurality of ATMs based on the monitored currency information;
   the one or more predetermined criteria includes minimizing the cost of redistributing physical currency throughout the currency network while supplying sufficient physical currency inventory in the plurality of ATMs.

2. A currency system comprising:
   a currency network for handling and distributing physical currency; an information router for receiving currency information from the currency network;
   a currency analyzer for locating the position of all the physical currency in the network and for determining how the physical currency should be located in the network to fulfill one or more predetermined criteria;
   a currency transfer reporter for receiving currency transfer requests from the analyzer, for issuing currency transfer instructions to a cash mover, for receiving currency transfer confirmations from the cash mover, and for automatically reconciling currency transfer instructions with currency transfer confirmations; and
   a dispatcher for dispatching a resource to the currency network, wherein (i) the information router is operable to receive state of health information, and (ii) the router is operable to direct state of health information to the dispatcher, and to direct currency information to the currency analyzer;
   the one or more predetermined criteria includes minimizing the cost of redistributing physical currency throughout the currency network.

3. A currency system comprising:
   a currency network for handling and distributing physical currency;
   an information router for receiving currency information from the currency network;
   a currency analyzer for locating the position of all the physical currency in the network and for determining how the physical currency should be located in the network to fulfill one or more predetermined criteria;
   a currency transfer reporter for receiving currency transfer requests from the analyzer, for issuing currency transfer instructions to a cash mover, for receiving currency transfer confirmations from the cash mover, and for automatically reconciling currency transfer instructions with currency transfer confirmations; and
   a dispatcher for dispatching a resource to the currency network, wherein (i) the information muter is operable to receive state of health information, and (ii) the router is operable to direct state of health information to the dispatcher, and to direct currency information to the currency analyzer;
   the one or more predetermined criteria includes minimizing the cost of the currency network while providing a high level of service.

4. A currency system comprising:
   a currency network for handling and distributing currency;
   an information router for receiving currency information from the currency network;
   a currency analyzer for locating the position of all the physical currency in the network and for determining how the physical currency should be located in the network to fulfill one or more predetermined criteria;
   a currency transfer reporter for receiving currency transfer requests from the analyzer, for issuing currency transfer instructions to a cash mover, for receiving currency transfer confirmations from the cash mover, and for automatically reconciling currency transfer instructions with currency transfer confirmations; and
   a dispatcher for dispatching a resource to the currency network, the dispatcher is in communication with a service center for dispatching service personnel for servicing terminals in the currency network, and also in communication with a cash mover for dispatching replenishment personnel for replenishing terminals in the currency network;
   the currency network further comprises a plurality of automated teller machines (ATMs), each ATM transmitting currency information including the amount of its dispensable inventory of physical currency, the currency analyzer monitoring transmitted currency information;

the currency network further comprises a vault, the vault storing physical currency to replenish the plurality of ATMs;

the one or more predetermined criteria includes minimizing the cost of redistributing physical currency throughout the currency network while supplying sufficient currency inventory in the plurality of ATMs.

5. A currency system comprising:

a currency network for handling and distributing currency;

an information router for receiving currency information from the currency network;

a currency analyzer for locating the position of all the physical currency in the network and for determining how the physical currency should be located in the network to fulfill one or more predetermined criteria;

a currency transfer reporter for receiving currency transfer requests from the analyzer, for issuing currency transfer instructions to a cash mover, for receiving currency transfer confirmations from the cash mover, and for automatically reconciling currency transfer instructions with currency transfer confirmations; and a dispatcher for dispatching a resource to the currency network, the dispatcher is in communication with a service center for dispatching service personnel for servicing terminals in the currency network, and also in communication with a cash mover for dispatching replenishment personnel for replenishing terminals in the currency network;

the one or more predetermined criteria includes minimizing the cost of redistributing physical currency throughout the currency network.

6. A currency system comprising:

a currency network for handling and distributing currency;

an information router for receiving currency information from the currency network; a currency analyzer for locating the position of all the physical currency in the network and for determining how the physical currency should be located in the network to fulfill one or more predetermined criteria;

a currency transfer reporter for receiving currency transfer requests from the analyzer, for issuing currency transfer instructions to a cash mover, for receiving currency transfer confirmations from the cash mover, and for automatically reconciling currency transfer instructions with currency transfer confirmations; and a dispatcher for dispatching a resource to the currency network, the dispatcher is in communication with a service center for dispatching service personnel for servicing terminals in the currency network, and also in communication with a cash mover for dispatching replenishment personnel for replenishing terminals in the currency network;

the one or more predetermined criteria includes minimizing the cost of the currency network while providing a high level of service.

* * * * *

UNITED STATES PATENT AND TRADEMARK OFFICE
CERTIFICATE OF CORRECTION

PATENT NO. : 7,219,083 B2
APPLICATION NO. : 09/795721
DATED : May 15, 2007
INVENTOR(S) : D. Bellucci et al.

It is certified that error appears in the above-identified patent and that said Letters Patent is hereby corrected as shown below:

Column 16, Line 32, after "information" delete "muter" and insert --router--.

Signed and Sealed this

Fifteenth Day of April, 2008

JON W. DUDAS
*Director of the United States Patent and Trademark Office*